US012757109B2

(12) United States Patent
Hong et al.

(10) Patent No.: US 12,757,109 B2
(45) Date of Patent: Oct. 6, 2026

(54) METHOD AND APPARATUS FOR SELECTING NETWORK SLICE ADMISSION CONTROL FUNCTION

(71) Applicant: BEIJING XIAOMI MOBILE SOFTWARE CO., LTD., Beijing (CN)

(72) Inventors: Wei Hong, Beijing (CN); Yang Shen, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 306 days.

(21) Appl. No.: 18/294,998

(22) PCT Filed: Aug. 6, 2021

(86) PCT No.: PCT/CN2021/111314

§ 371 (c)(1),
(2) Date: Feb. 2, 2024

(87) PCT Pub. No.: WO2023/010566

PCT Pub. Date: Feb. 9, 2023

(65) Prior Publication Data

US 2025/0008422 A1 Jan. 2, 2025

(51) Int. Cl.

*H04W 12/00* (2021.01)
*H04W 8/22* (2009.01)
*H04W 48/18* (2009.01)
*H04W 60/04* (2009.01)
*H04W 60/06* (2009.01)

(52) U.S. Cl.

CPC ............ *H04W 48/18* (2013.01); *H04W 8/22* (2013.01); *H04W 60/04* (2013.01); *H04W 60/06* (2013.01)

(58) Field of Classification Search

None

See application file for complete search history.

(56) References Cited

U.S. PATENT DOCUMENTS

| | | | | |
|---|---|---|---|---|
| 10,827,360 | B2 * | 11/2020 | Yu | H04W 16/10 |
| 11,122,416 | B2 * | 9/2021 | Lee | H04W 8/082 |
| 11,910,348 | B2 * | 2/2024 | Wang | H04W 60/06 |
| 2022/0330139 | A1 * | 10/2022 | Lee | H04W 60/00 |
| 2024/0147235 | A1 * | 5/2024 | Velev | H04L 63/10 |
| 2024/0259979 | A1 * | 8/2024 | Merino Vazquez | H04W 48/18 |
| 2024/0259982 | A1 * | 8/2024 | Tiwari | H04W 28/02 |
| 2024/0260112 | A1 * | 8/2024 | Tiwari | H04W 48/18 |
| 2024/0406854 | A1 * | 12/2024 | Velev | H04W 28/20 |

OTHER PUBLICATIONS

European Patent Application No. 21952439.4, Search Report and Opinion dated Sep. 2, 2024, 10 pages.

3rd Generation Partnership Project; Technical Specification Group Services and System Aspects; System architecture for the 5G System (5GS); Stage 2(Release 17), 3GPP TS 23.501, Jun. 2021, 526 pages.

(Continued)

*Primary Examiner* — Sithu Ko

(74) *Attorney, Agent, or Firm* — Cozen O'Connor

(57) ABSTRACT

A method for selecting a network slice admission control function (NSACF). The method includes selecting the NSACF for a network slice based on service area information of the NSACF.

14 Claims, 5 Drawing Sheets

(56) References Cited

OTHER PUBLICATIONS

Huawei et al. "Network Slice Admission Control Functionalities and Services" 3GPP TSG-SA WG2 Meeting #143E, S2-2100708, Feb.-Mar. 2021, 5 pages.
Ericsson et al. "TS23.502 KI#1 Network Slice Admission Control Function (NSACF)—Result Update" 3GPP TSG-SA WG2 Meeting #144E, S2-2102209, Apr. 2021, 5 pages.
PCT/CN2021/111314 International Search Report dated Apr. 27, 2022, 2 pages.
NTT Docomo "NSACF discovery and selection", 3GPP TSG-SA WG2 Meeting #144E e-meeting S2-2102324, Apr. 2021, 9 pages.
NTT Docomo "Updates of NSACF discovery and selection" 3GPP TSG-SA WG2 Meeting #144E e-meeting S2-2102323, Apr. 2021, 3 pages.

* cited by examiner

METHOD AND APPARATUS FOR SELECTING NETWORK SLICE ADMISSION CONTROL FUNCTION

CROSS-REFERENCE TO RELATED APPLICATION

This application is a U.S. national phase of International Application No. PCT/CN2021/111314, filed with the State Intellectual Property Office of P. R. China on Aug. 6, 2021.

TECHNICAL FIELD

The present disclosure relates to a technical field of mobile communications, and in particular to a method and an apparatus for selecting a network slice admission control function (NSACF).

BACKGROUND

Network slicing technologies allow operators to provide various customized networks, for example providing networks with different requirements of functionality or performance (such as different latencies, mobilities, availabilities, reliabilities, and data rate bandwidths, or the like); or to provide network functions for specific users, such as multimedia system users, public security users, company customers, roamers, or mobile virtual network operator host.

At present, a network function (NF) usually utilizes a network repository function (NRF) to perform processes of discovery and selection. However, selecting an appropriate network slice admission control function (NSACF) to make it more conducive to implementing functions of monitoring and counting the number of UEs for the network slice and functions of monitoring and counting the number of slice sessions (for example, with fewer signaling interactions, reduction in function switching caused by a UE mobility, optimization of function implementations) is still a key problem to be solved.

SUMMARY

According to a first aspect of the present disclosure, a method for selecting an NSACF is provided, the method is performed by a network device, and the method includes: selecting the NSACF for a network slice based on service area information of the NSACF.

According to a second aspect of the present disclosure, a communication apparatus is provided, including: a transceiver; a memory; and a processor, in which the processor respectively connects to the transceiver and the memory, and is configured to execute computer-executable instructions stored on the memory to control reception and transmission of a wireless signal by the transceiver and implement the method according to the first aspect of the embodiments.

According to a third aspect of the present disclosure, a computer storage medium storing computer-executable instructions thereon, in which when the computer-executable instructions are executed by a processor, the method according to the first aspect of the embodiments is implemented.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of the present disclosure will become apparent and more readily appreciated from the following descriptions made with reference to the drawings, in which.

DETAILED DESCRIPTION

Figure 1:
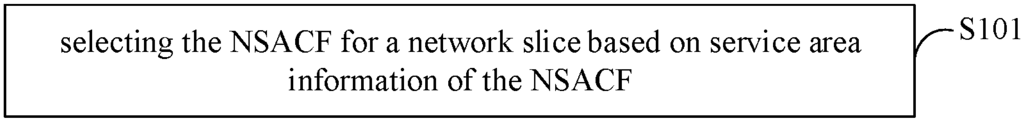
FIG. 1 is a flowchart of a method for selecting a network slice admission control function (NSACF) executed by a network device according to an embodiment of the present disclosure.

Embodiments of the present disclosure are described in detail below, and examples of embodiments are illustrated in the accompanying drawings, in which the same or similar labels represent the same or similar elements or elements with the same or similar functions. The embodiments described below with reference to the drawings are exemplary, are intended to be configured to explain the present disclosure and are not to be construed as a limitation of the present disclosure.

Network slicing technologies allow operators to provide various customized networks. For example, there may be a difference between requirements on functionality (e.g., priority, billing, policy control, security, and mobility), there may be a difference between performance requirements (e.g., latency, mobility, availability, reliability, and data rate), or corresponding services are provided only for specific users (e.g., multimedia system users, public security users, company customers, roamers, or mobile virtual network operator host).

A network slice may provide the functionality of a complete network, including a radio access network function, a core network function, an IP multimedia subsystem (IMS) function, and the like. One network may support one or more network slices. Due to differences between network functions and performances supported by the network slices, there may be a difference between the network slices. A network slice instance refers to an instantiation of a network slice, that is, a set of deployment network functions of an expected network slice service is transmitted according to a network slice template.

The characteristics and network function optimizations supported by different network slices may be different. Different network slices may have different single-network slice selection assistance information (S-NSSAIs) which have different slice/service types (SSTs) to identify different slice or service types.

An operator may deploy multiple network slices for different groups or categories of UEs (for example, delivering different service features) providing a same function, or provide a user-specific network. Slices in such a scenario may have a same type, but using different S-NSSAIs to identify.

A selection of a set of network slice instances for a UE is usually triggered by a first access and mobility management function (AMF) in a registration procedure. The first AMF interacts with a network slice selection function (NSSF). A slice selection may result in a reselection of the AMF. One protocol data unit (PDU) session belongs to and only belongs to a specific network slice instance in a public land mobile network (PLMN). Although different network slice instances may have slice-specific PDU sessions using a same data network name (DNN), different network slice instances do not share a same PDU session. During a handover procedure, a source AMF selects a target AMF by interacting with a network repository function (NRF).

A network slice type (NEST) is applied to a network slice. For one network slice, more than one network slice instance may be deployed. A generic network slice template (GST) defines attributes supported by the network slice. For example, 1) number of terminals, which is an attribute describes the maximum number of terminals that can use the network slice simultaneously; 2) number of connections, which is an attribute describes the maximum number of concurrent sessions supported by the network slice. These are important input for determining a scale of the network slice and providing enough resources for the network slice.

The network slice may support a limited number of user equipments (UEs) using the network slice simultaneously and support a limited number of the concurrent sessions. In order to support controls of the number of the terminals and the number of PDU sessions of the network slice, in a 5th Generation (5G) communication system, a network slice admission control function (NSACF) is introduced. For a network slice subjected to network slice admission control (NSAC), the NSACF monitors and controls the number of registered UEs per network slice and the number of PDU sessions per network slice.

More than one NSACF may be deployed in the network, or more than one NSACF instance may be deployed. In an operator's network, different NSACF deployment options may be included. More than one NSACF may be deployed for one network slice. Or more than one NSACF provides services for more than one network slice of a large network for scalability purpose. A single or more than one NSACF is dedicated for a specific network slice to provide a customized service, such as an isolation slice. In addition, when more than one network slice instance is used in one network slice, the above solutions may also be possible.

About the NSACF discovery and selection, the network function (NF) typically utilizes the NRF to perform. The NSACF discovery and selection may be performed by a discovery end network function using the NRF, or may be performed based on an operator policy such as a local configuration. This solution is applicable to the discovery and selection of an NSACF or an NSACF instance. However, how to select an appropriate NSACF more accurately and with fewer signaling to make it more conducive to implementing functions of monitoring and counting the number of UEs for the network slice and functions of monitoring and counting the number of slice sessions (for example, with fewer signaling or function interactions, support and optimization of function implementations) is still a key problem to be solved urgently.

More than one NSACF may be deployed in the PLMN, but how to select an appropriate NSACF more accurately and with fewer signaling or function interactions is still a key problem to be solved urgently.

Thus, a purpose of the disclosure is to select an appropriate NSACF in consideration of factors such as an NSACF per region; to select the appropriate NSACF with fewer signaling, such as less transmissions of network slice status notifications and reports or NF device relocation, and the like; and to select the appropriate NSACF with a higher accuracy.

A method and an apparatus for selecting an NSACF are provided in the disclosure. A network device selects the NSACF for the network slice based on service area information of the NSACF. The network device selects the NSACF by considering the service area information of the NSACF, which can select the appropriate NSACF more accurately and with less signaling and function interactions.

The method and apparatus for selecting an NSACF provided in the disclosure are described in detail below with reference to the accompanying drawings.

FIG. 1 illustrates a flowchart of a method for selecting an NSACF according to an embodiment of the present disclosure. As illustrated in FIG. 1, the method can be executed by a network device. The method may include the following steps.

S101, the NSACF is selected for a network slice based on service area information of the NSACF.

Since more than one NSACF may be deployed in a network such as a PLMN, there is still a lack of effective technical means to select an appropriate NSACF from a large number of NSACFs.

Therefore, the method for selecting an NSACF is provided in the embodiments of the disclosure, in which the network device selects the NSACF for the network slice based on the service area information of the NSACF.

It should be noted that when the deployed NSACF has more than one NSACF instance, the method for selecting the NSACF in the embodiments is also applicable, that is, an NSACF instance may be selected based on service area information of the NSACF instance, and the specific details are not described herein again.

In some embodiments, the network device may be an AMF.

The AMF may select the NSACF for the network slice to monitor a number of registered UEs of the network slice.

In some embodiments, if the network device is the AMF, the service area information may include any one or more of a tracking area identity (TAI) list; or AMF service area information.

The service area information of the NSACF may include the TAI list, and the AMF may select the NSACF for the network slice based on the TAI list of the NSACF. A tracking area (TA) is defined as a free moving area in which a UE does not need to update a service. The TA is a cell-level configuration, more than one cell may be configured with a same TA, and one cell may only belong to one TA. The TAI is a TA identifier, and includes the PLMN and a tracking area code (TAC). More than one TA may form a TA list and are simultaneously allocated to one UE. The UE does not need to perform a TA update when moving within the TA list to reduce frequent interactions with the network. A TA update needs to be performed when the UE enters a new TA not in the TA list registered by the UE, so that the UE is reallocated with a group of TAs. For example, in the case of the UE registration, the AMF needs to select the NSACF for a corresponding network slice (for example, identified by the S-NSSAIs included in a registration request from the UE). If the service area information of the NSACF includes the TAI list, the AMF may select the NSACF based on the TAI list of the NSACF to monitor the number of registered UEs of the network slice. The TAI list of the selected NSACF includes, for example, the TA identifier in the TA list allocated to the UE.

In addition, in the case that the service area information of the NSACF includes the TAI list, TAI lists of different NSACFs are different. For example, for more than one NSACF or NSACF instance which may be used for a certain region and is deployed in the network, TAs included in the TAI lists of several NSACFs or NSACF instances can cover the entire region, and TAs included in the TAI lists of other NSACFs or NSACF instances can only cover a portion of the region. That is, the TAI lists of the several NSACFs or NSACF instances may be a TAI list 1 corresponding to the entire region, and the TAI lists of other NSACFs or NSACF instances may be subsets of the TAI list 1, respectively.

The service area information of the NSACF may include AMF service area information, and the AMF selects the NSACF for the network slice based on the AMF service area information of the NSACF. For example, in the case of the UE registration, the AMF needs to select the NSACF for the corresponding network slice (for example, identified by the S-NSSAIs included in the registration request from the UE). If the service area information of the NSACF includes the AMF service area information, the AMF may select the NSACF based on the AMF service area information of the NSACF to monitor the number of registered UEs of the network slice. The AMF service area information of the selected NSACF is, for example, the service area information of the AMF.

According to the method for selecting an NSACF in the embodiment, the network device may select the NSACF for the network slice based on the service area information of the NSACF. By considering the service area information of the NSACF, an appropriate NSACF can be selected more accurately and with less signaling and function interactions.

Figure 2:
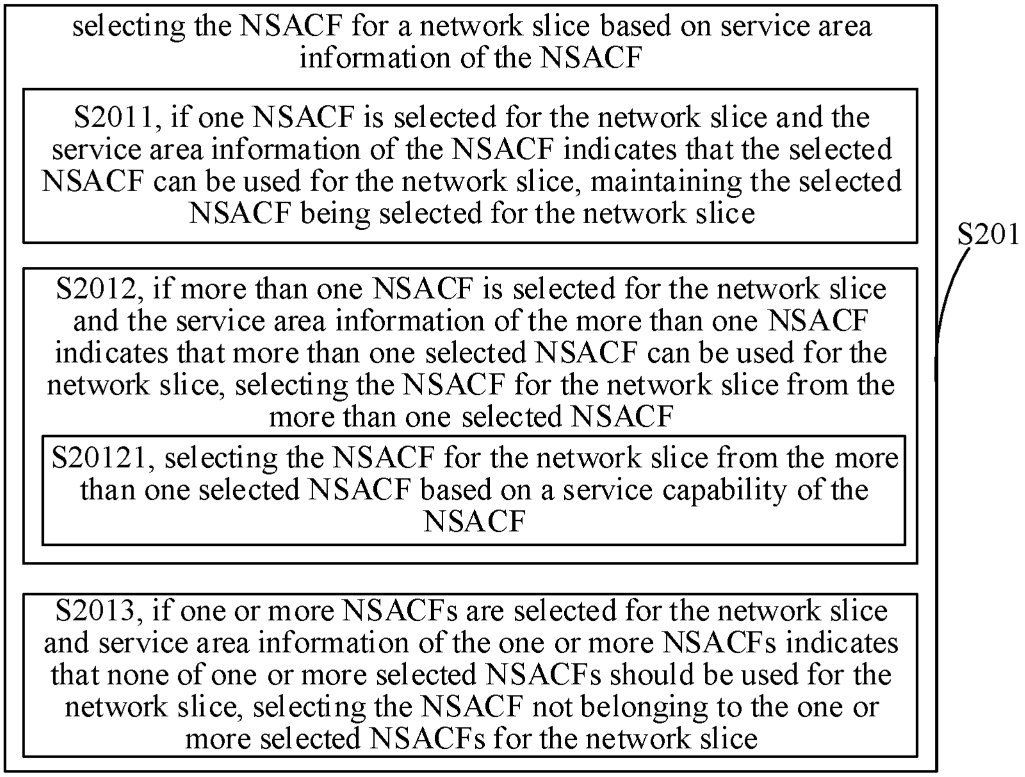
FIG. 2 is a flowchart of a method for selecting an NSACF according to an embodiment of the present disclosure.

FIG. 2 illustrates a flowchart of a method for selecting an NSACF according to an embodiment of the present disclosure, the method may be executed by a network device. As illustrated in FIG. 2, the method may include the following steps.

S201, the NSACF is selected for a network slice based on service area information of the NSACF.

In an embodiment, the network device may be an AMF.

In some embodiments, the service area information may include any one or more of: a TAI list; and AMF service area information.

For the specific details of S201, reference may be made to step S101 in FIG. 1 and the related description thereof, which is not described herein.

In the embodiment, step S201 may include any one of the following steps.

S2011, if one NSACF is selected for the network slice and the service area information of the NSACF indicates that the selected NSACF can be used for the network slice, the selected NSACF is maintained being selected for the network slice.

When the network device selects the NSACF for the network slice, there is a case, that is, one NSACF has been selected for the network slice, for example, the NSACF may be selected for the corresponding network slice in a registration procedure of a certain UE, in the registration procedure of another UE, if the S-NSSAIs carried in a registration request of the another UE still identify the network slice, the above case may occur.

In this case, if the service area information of the selected NSACF indicates that it can be used for the network slice, the network device still selects the NSACF to monitor the number of registered UEs of the network slice. That is, the selected NSACF is maintained for the network slice.

For example, as shown in the embodiment of FIG. 1, when the network device is the AMF, if the service area information of the selected NSACF is the TAI list and the TAI list includes a TA identifier in the TA list allocated to the UE which requests the service of monitoring the number of registered UEs of the network slice, it indicates that the selected NSACF can be used for the network slice, and the AMF maintains the selected NSACF monitoring the number of registered UEs of the network slice. For another example, when the service area information of the selected NSACF is the AMF service area information, if the AMF service area information of the selected NSACF is the service area information of the AMF, it indicates that the selected NSACF can be used for the network slice. The AMF maintains the selected NSACF monitoring the number of registered UEs of the network slice.

S2012, if more than one NSACF is selected for the network slice and the service area information of the more than one NSACF indicates that the more than one selected NSACF can be used for the network slice, the NSACF is selected for the network slice from the more than one selected NSACF.

When the network device selects the NSACF for the network slice, there is such a case that more than one NSACF has been selected for the network slice.

In this case, if the service area information of the more than one selected NSACF indicates that the more than one selected NSACF can be used for the network slice, the network device may select the NSACF from the more than one selected NSACF to monitor the number of registered UEs of the network slice.

In some embodiments, step S2012 may include the following steps.

S20121, the NSACF is selected for the network slice from the more than one selected NSACF based on a service capability of the NSACF.

The service capability includes at least one of: a first service capability that supports monitoring the number of the registered UEs of the network slice, or a second service capability that supports monitoring the number of PDU sessions created by the network slice.

The NSACF may have a variety of different service capabilities, such as the NSACF may have the service capability which only supports monitoring the number of registered UEs of the network slice, or the NSACF may have the service capability which only supports monitoring the number of PDU sessions created by the network slice, or the NSACF may have the service capability which supports both monitoring the number of registered UEs of the network slice and monitoring the number of PDU sessions created by the network slice. If the NSACF is directly selected without considering the service capability of the NSACF, it is possible to select an NSACF that does not meet the requirement. For example, in the case of the UE registration, if the AMF directly selects the NSACF for the network slice without considering the service capability of the NSACF, it is possible to select the NSACF that does not have the service capability which supports monitoring the number of registered UEs of the network slice, that is, the NSACF that does not meet the requirement is selected.

Therefore, when the network device selects the NSACF for the network slice from the more than one selected NSACF, the NSACF may also be selected by considering the service capability of the NSACF.

Specifically, in the case that the network device is the AMF, the AMF may select, for the network slice, the NSACF having the service capability which only supports monitoring the number of registered UEs of the network slice from the more than one selected NSACF, or the NSACF having the service capability which supports both monitoring the number of registered UEs of the network slice and monitoring the number of PDU sessions created by the network slice, so as to monitor the number of registered UEs of the network slice.

S2013, if one or more NSACFs are selected for the network slice and service area information of the one or more NSACFs indicates that none of the one or more selected NSACFs can be used for the network slice, the NSACF not belonging to the one or more selected NSACFs is selected for the network slice.

As described above, when the network device selects the NSACF for the network slice, there is such a case that one or more NSACFs have been selected for the network slice.

In this case, if the service area information of the one or more selected NSACFs indicates that none of the one or more selected NSACFs should be used for the network slice, the network device selects a new NSACF for the network slice to monitor the number of registered UEs of the network slice. The new NSACF does not belong to the one or more selected NSACFs.

For example, as shown in the embodiment of FIG. 1, when the network device is the AMF, if the service area information of the one or more selected NSACFs is the TAI list and none of the TAI lists of the one or more selected NSACFs includes a TA identifier in the TA list allocated to the UE which requests the service of monitoring the number of registered UEs of the network slice, it indicates that the one or more selected NSACFs are not appropriate for the network slice. The AMF selects a new appropriate NSACF for the network slice to monitor the number of registered UEs of the network slice. For another example, when the service area information of the one or more selected NSACFs is the AMF service area information, if none of the AMF service area information of the one or more selected NSACFs is the service area information of the AMF, it indicates that the one or more selected NSACFs are not appropriate for the network slice. The AMF selects a new appropriate NSACF for the network slice to monitor the number of registered UEs of the network slice.

According to the method for selecting an NSACF in the embodiment, in the case that an NSACF is selected for the network slice, the network device may select the NSACF for the network slice by considering the service area information of the selected NSACF, so that the network device may select the appropriate NSACF more accurately and with less signaling and function interactions.

Figure 3:
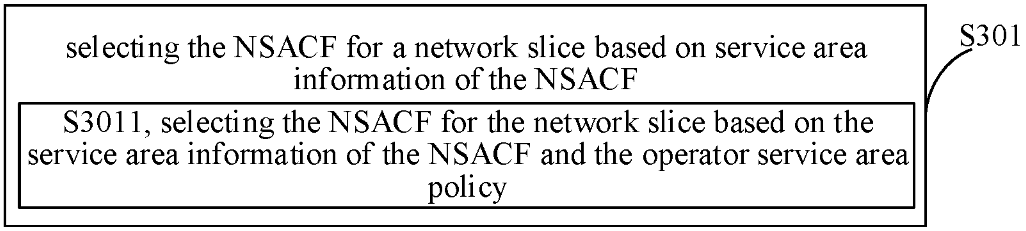
FIG. 3 is a flowchart of a method for selecting an NSACF according to an embodiment of the present disclosure.

FIG. 3 illustrates a flowchart of a method for selecting an NSACF according to an embodiment of the disclosure, the method may be executed by a network device. As illustrated in FIG. 3, the method may include the following steps.

S301, the NSACF is selected for a network slice based on service area information of the NSACF.

In an embodiment, the network device may be an AMF.

In some embodiments, when the network device is the AMF, the service area information may include any one or more of: a TAI list; or AMF service area information.

For the specific details of S301, reference may be made to the related description of step S101 in FIG. 1, which is not described herein.

In the embodiment, when there is an operator service area policy, the NSACF may be selected for the network slice by the following steps.

S3011, the NSACF is selected for the network slice based on the service area information of the NSACF and the operator service area policy.

The operator service area policy includes a specific rule of selecting the NSACF based on the service area information made by an operator.

In the embodiment, when there is the operator service area policy, the network device selects the NSACF for the network slice based on the operator service area policy and the service area information of the NSACF, so that the selected NSACF can satisfy the operator service area policy.

In the case that the network device is the AMF, the operator service area policy may include the TAI list, a policy priority of the AMF service area information, or one or more pieces of TA information in the AMF service area information, or a priority of each of NSACFs having a service capability which supports monitoring the number of registered UEs of the network slice, or location information of a UE which requests a service of monitoring the number of registered UEs of the network slice, or registered TA information of the UE which requests the service of monitoring the number of registered UEs of the network slice, and the like.

It should be noted that the operator service area policy listed herein is merely an example, and in a practical application, the operators may formulate various operator service area policies according to their own requirements, which is not limited in the present disclosure.

As shown in the embodiment of FIG. 1, when the network device is the AMF, for example, when the service area information of the NSACF is the TAI list, if the operator service area policy is selection of an NSACF including a TAI list that completely matches the TA list of the UE which requests the service of monitoring the number of registered UEs of the network slice, the AMF selects the NSACF satisfying the operator service area policy for the network slice based on the TAI list of the NSACF. Specifically, for example, if there are three NSACFs, respectively represented as NSACF1-NSACF3. The TAI list of the NSACF1 includes an identifier TAI1 of a TA1, an identifier TAI2 of a TA2, and an identifier TAI3 of a TA3. The TAI list of the NSACF2 includes the identifier TAI1 of the TA1, the identifier TAI2 of the TA2, and an identifier TAI4 of a TA4. The TAI list of the NSACF3 includes the identifier TAI1 of the TA1, the identifier TAI3 of the TA3, and the identifier TAI4 of the TA4. The TA list allocated to the UE which requests the service of monitoring the number of registered UEs of the network slice includes the TA1, the TA2, and the TA3. The AMF selects the NSACF1 to monitor the number of registered UEs of the network slice, because the TAI list of the NSACF1 completely matches the TA list allocated to the UE, which conforms to the operator service area policy. For another example, if the operator service area policy is that the AMF service area information has the highest policy priority, the AMF selects the NSACF for the network slice based on the TAI list of the NSACF with considering the service area information of the AMF. Specifically, since the operator service area policy indicates that the policy of the AMF service area information has the highest priority, the AMF may first consider the service area information of the AMF to select the NSACF of which the TAI list matching the service area information of the AMF.

In some embodiments, the operator service area policy is pre-configured in at least one of the network device and an NRF.

The operator service area policy is pre-configured in the network device, or may be pre-configured in the NRF. When the operator service area policy is pre-configured in the NRF, the network device may obtain the operator service area policy by accessing the NRF.

In some embodiments, if one NSACF is selected for the network slice and the service area information of the NSACF and the operator service area policy both indicate that the selected NSACF can be used for the network slice, the network device maintains the selected NSACF being selected for the network slice.

For example, when the service area information of the selected NSACF is the TAI list and the operator service area strategy is selection of the NSACF having the TAI list that completely matches the TA list of the UE which requests the service of monitoring the number of registered UEs of the network slice, if the TAI list of the selected NSACF completely matches the TA list allocated to the UE, it indicates that the selected NSACF can be used for the network slice. The network device maintains the selected NSACF monitoring the number of registered UEs of the network slice.

In some embodiments, if more than one NSACF has been selected for the network slice and the service area information of the NSACF and the operator service area policy both indicate that the more than one selected NSACF can be used for the network slice, the network device selects the NSACF from the more than one selected NSACF for the network slice. Specifically, the network device may select the NSACF for the network slice from the more than one selected NSACF based on the service capability of the NSACF, the related details may refer to the related description of step S2012 in FIG. 2.

In some embodiments, if one or more NSACFs have been selected for the network slice, the service area information of the one or more NSACFs or the operator service area strategy indicate that none of the one or more selected NSACFs can be used for the network slice, the network device selects the NSACF not belonging to the one or more selected NSACFs for the network slice based on the operator service area policy and the service area information of the NSACF.

For example, in the case that the network device is the AMF, when the service area information of the one or more selected NSACFs is the TAI list and the operator service area strategy is selection of the NSACF having the TAI list which completely matches the TA list of the UE which requests the service of monitoring the number of registered UEs of the network slice, if none of the TAI lists of the one or more selected NSACFs includes the TA identifier in the TA list allocated to the UE which requests the service of monitoring the number of registered UEs of the network slice, or the TAI lists of some of the one or more selected NSACFs include the TA identifier that is in the TA list allocated to the UE but not completely matches the TA list allocated to the UE, it indicates that the one or more selected NSACFs are not appropriate for the network slice. The AMF selects a new appropriate NSACF for the network slice to monitor the number of registered UEs of the network slice.

According to the method for selecting an NSACF in the embodiment, if there is the operator service area strategy, the network device selects the NSACF based on the service area information of the NSACF according to the operator service area strategy, so that the selected NSACF can satisfy the operator service area strategy.

Figure 4:
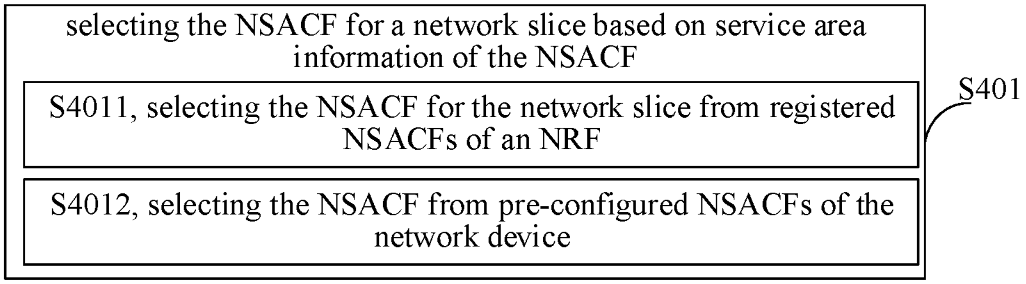
FIG. 4 is a flowchart of a method for selecting an NSACF according to an embodiment of the present disclosure.

FIG. 4 illustrates a flowchart of a method for selecting an NSACF according to an embodiment of the disclosure, the method may be executed by a network device. As illustrated in FIG. 4, the method may include the following steps.

S401, the NSACF is selected for a network slice based on service area information of the NSACF.

In an embodiment, the network device may be an AMF.

In some embodiments, when the network device is the AMF, the service area information may include any one or more of: a TAI list; or AMF service area information.

For the specific details of S401, reference may be made to step S101 in FIG. 1 and the related description thereof, which is not described herein.

In the embodiment, step S401 may include any one of the following steps.

S4011, the NSACF is selected for the network slice from registered NSACFs of an NRF. The NRF stores configuration information of the registered NSACFs, and the configuration information includes S-NSSAIs and the service area information of the registered NSACFs.

The NSACF may be registered in the NRF, the NSACF provides its configuration information to the NRF, and the NRF marks that the NSACF is available. In a registration procedure of the NSACF, the NSACF provides the S-NSSAIs and the service area information of the NSACF. That is, the configuration information of the NSACF registered in the NRF may include the S-NSSAIs and the service area information thereof. The network device may utilize the NRF to discover and select the NSACF.

The S-NSSAIs may include more than one S-NSSAI, and the S-NSSAI identifies the network slice, which is auxiliary information used by a network to select a specific network slice instance. The S-NSSAI may include the following information: an SST, indicating network slices with different functions and services; and a slice differentiator, which is optional information supplementing to the SST, configured to further distinguish the network slice instance from all the network slice instances conforming to the SST.

In some embodiments, the network device selects the NSACF for the network slice from the registered NSACFs in the NRF based on the service area information of the NSACF.

For the specific details of how the network device selects the NSACF based on the service area information of the NSACF, reference may be made to the related description of step S101 in FIG. 1, which is not described herein.

In some embodiments, if one or more NSACFs are selected for the network slice and the service area information of the one or more NSACFs indicates none of the one or more selected NSACFs should be used for the network slice, the network device select, for the network slice, the NSACF not belonging to the one or more selected NSACFs from the registered NSACFs in the NRF based on the service area information of the NSACF.

For the specific details of how the network device selects the NSACF not belonging to the one or more selected NSACFs in this case, reference may be made to the related description of step S2013 in FIG. 2, which is not described herein.

In some embodiments, when there is an operator service area policy, the network device selects the NSACF from the registered NSACFs in the NRF according to the service area information of the NSACF and the operator service area policy. If one or more NSACFs have been selected for the network slice but the service area information of the one or more selected NSACFs or the operator service area policy indicates that none of the one or more selected NSACFs should be used for the network slice, the network device selects, for the network slice, the NSACF not belonging to the one or more selected NSACFs from the registered NSACFs in the NRF based on the service area information of the NSACF and the operator service area policy.

For the specific details of how the network device selects the NSACF based on the service area information of the NSACF and the operator service area strategy, reference may be made to the related description of step S3011 in FIG. 3, which is not described herein.

S4012, the NSACF is selected from pre-configured NSACFs of the network device, the network device stores configuration information of the pre-configured NSACFs, and the configuration information includes the S-NSSAIs and the service area information of the pre-configured NSACFs.

The NSACF may be locally configured in the network device. The configuration information of the NSACF may indicate the service area information of the NSACF and the S-NSSAIs. The network device may utilize the configuration information to discover and select the NSACF.

In some embodiments, the network device selects the NSACF from the pre-configured NSACFs of the network device based on the service area information of the NSACF.

For the specific details of how the network device selects the NSACF based on the service area information of the NSACF, reference may be made to the related description of step S101 in FIG. 1, which is not described herein.

In some embodiments, if the one or more NSACFs have been selected for the network slice and the service area information of the one or more NSACFs indicates that none of the one or more selected NSACFs should be used for the network slice, the network device selects the NSACF not belonging to the one or more selected NSACFs for the network slice from the pre-configured NSACFs of the network device based on the service area information of the NSACF.

For the specific details of how the network device selects the NSACF not belonging to the one or more selected NSACFs in this case, reference may be made to the related description of step S2013 in FIG. 2, which is not described herein.

In some embodiments, when there is the operator service area policy, the network device selects the NSACF from the pre-configured NSACF of the network device according to the service area information of the NSACF and the operator service area policy. If one or more NSACFs have been selected for the network slice, and the service area information of the one or more NSACFs or the operator service area policy indicates that none of the one or more selected NSACFs should be used for the network slice, the network device selects the NSACF not belonging to the one or more selected NSACFs for the network slice from the pre-configured NSACFs of the network device based on the service area information of the NSACF and the operator service area policy.

For the specific details of how the network device selects the NSACF based on the service area information of the NSACF and the operator service area policy, reference may be made to the related description of step S3011 in FIG. 3, which is not described herein.

According to the method for selecting an NSACF in the embodiment, the network device may select the corresponding NSACF from the NRF or local, thereby avoiding a complex NSACF selection procedure and reducing signaling transmissions.

Figure 5:
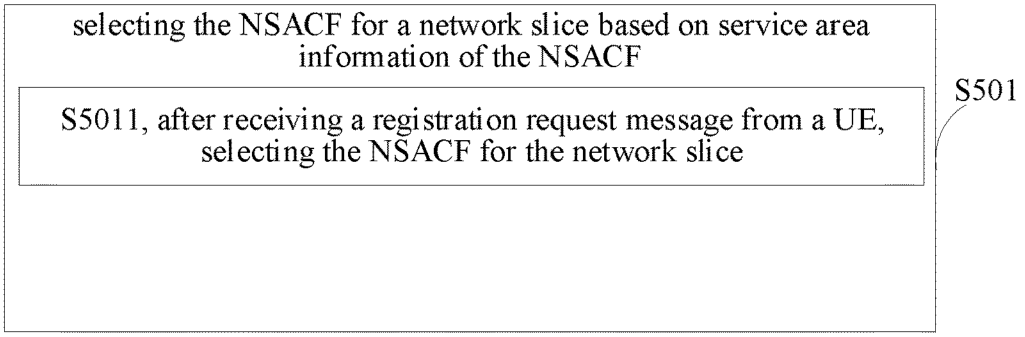
FIG. 5 is a flowchart of a method for selecting an NSACF according to an embodiment of the present disclosure.

FIG. 5 illustrates a flowchart of a method for selecting an NSACF according to an embodiment of the disclosure, the method may be executed by a network device. As illustrated in FIG. 5, the method may include the following steps.

S501, the NSACF is selected for a network slice based on service area information of the NSACF.

In an embodiment, the network device may be an AMF.

In some embodiments, when the network device is the AMF, the service area information may include any one or more of: a TAI list; or AMF service area information.

For the specific details of S501, reference may be made to step S101 in FIG. 1 and the related description thereof, which is not described herein.

In the embodiment, the NSACF may be selected for the network slice through the following steps.

S5011, after a registration request message is received from a UE, the NSACF is selected for the network slice, the registration request message is triggered in a UE registration procedure or the AMF relocation procedure, and the registration request message carries S-NSSAIs and a UE identifier.

In the embodiment, after receiving the registration request message from the UE, the AMF may determine whether to perform monitoring of the number of registered UEs for a corresponding network slice, and select the NSACF for the network slice to monitor the number of registered UEs of the network slice when it is determined that it is necessary to monitor the number of registered UEs of the network slice.

When the UE is registered to the network, the AMF may receive the registration request message from the UE, the registration request message carries the S-NSSAIs and the UE identifier. If allowed network slice assistance information (Allowed NSSAI) of the AMF includes the S-NSSAI carried in the registration request message, the AMF selects the NSACF based on the service area information of the NSACF.

When an AMF relocation is performed, the AMF may receive the registration request message sent by the UE which requests an AMF service from another AMF (the another AMF may be an AMF which previously provides service for the UE). The registration request message carries the S-NSSAIs and the UE identifier. If the Allowed NSSAI of the AMF includes the S-NSSAI carried in the registration request, the AMF selects the NSACF based on the service area information of the NSACF.

For the specific details of selecting the NSACF for the network slice, reference can be made to related descriptions of steps S101 in FIG. 1, steps S201 and S2011-S2013 in FIG. 2, steps S301 and S3011 in FIG. 3, and steps S401 and S4011-S4012 in FIG. 4.

According to the method for selecting an NSACF in the embodiment, the network device may perform a selection of the NSACF in response to the registration request message from the UE.

Figure 6:
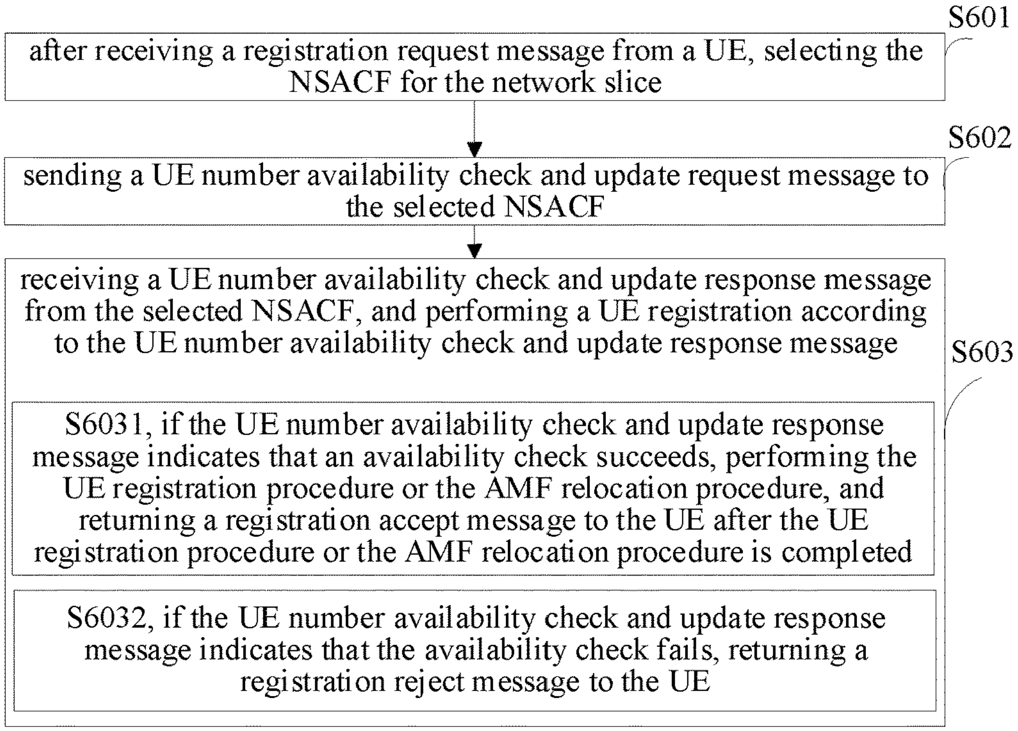
FIG. 6 is a flowchart of a method for selecting an NSACF executed by an access and mobility management function (AMF) according to an embodiment of the present disclosure.

FIG. 6 illustrates a flowchart of a method for selecting an NSACF according to an embodiment of the disclosure, the method may be executed by an AMF. As illustrated in FIG. 6, the method may include the following steps.

S601, after a registration request message is received from a UE, the NSACF is selected for the network slice, the registration request message is triggered in a UE registration procedure or an AMF relocation procedure, and the registration request message carries S-NSSAIs and a UE identifier.

For the specific details of S601, reference may be made to the related description of step S5011 in FIG. 5, which is not described herein.

S602, a UE number availability check and update request message is sent to the selected NSACF, the UE number availability check and update request message includes S-NSSAIs, a UE identifier, and an update flag, and the update flag instructs to increase the number of registered UEs.

After selecting the NSACF, the AMF may send the UE number availability check and update request message to the selected NSACF, so that the NSACF can check the number of registered UEs according to the UE number availability check and update request message.

S603, a UE number availability check and update response message is received from the selected NSACF, and a UE registration is performed according to the UE number availability check and update response message.

After receiving the UE number availability check and update request message, in response to the UE number availability check and update request message, the NSACF performs a check on the number of registered UEs, updates the number of registered UEs and/or feeds back the UE number availability check and update response message according to a check result. After receiving the UE number availability check and update response message, the AMF may perform the UE registration according to the response message.

In some embodiments, step S603 may include the following steps.

S6031, if the UE number availability check and update response message indicates that an availability check succeeds, the UE registration procedure or the AMF relocation procedure is performed, and a registration accept message is returned to the UE after the UE registration procedure or the AMF relocation procedure is completed.

In the case of the UE registration, if the UE number availability check and update response message indicates that the availability check succeeds, it indicates that the UE may register to a corresponding network slice. The AMF executes the UE registration procedure based on the UE number availability check and update response message and returns the registration accept message to the UE after completing the UE registration procedure.

In the case of the AMF relocation, if the UE number availability check and update response message indicates that the availability check succeeds, it indicates that the UE can register to the corresponding network slice. The AMF performs the AMF relocation procedure based on the UE number availability check and update response message and returns the registration accept message to the UE after completing the AMF relocation procedure.

S6032, if the UE number availability check and update response message indicates that the availability check fails, a registration reject message is returned to the UE.

In the case of the UE registration, if the UE number availability check and update response message indicates that the availability check fails, it indicates that the UE cannot register to the corresponding network slice. For example, due to reasons such as that the number of the registered UEs of the network slice has reached a maximum number, the AMF returns the registration reject message to the UE based on the UE number availability check and update response message.

In the case of the AMF relocation, if the UE number availability check and update response message indicates that the availability check fails, it indicates that the UE cannot register to the corresponding network slice. For example, due to reasons such as that the number of the registered UEs of the network slice has reached a maximum number, the AMF returns the registration reject message to the UE based on the UE number availability check and update response message.

According to the method for selecting an NSACF in the embodiment, the AMF may monitor the number of registered UEs of the corresponding network slice through the NSACF after the NSACF is selected.

Figure 7:
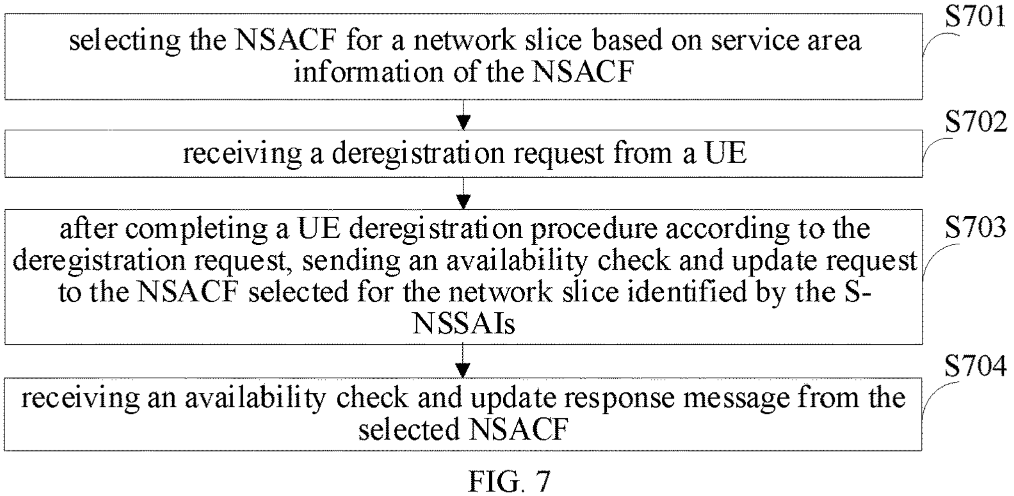
FIG. 7 is a flowchart of a method for selecting an NSACF according to an embodiment of the present disclosure.

FIG. 7 illustrates a flowchart of a method for selecting an NSACF according to an embodiment of the disclosure, the method may be executed by an AMF. As illustrated in FIG. 7, the method may include the following steps.

S701, the NSACF is selected for a network slice based on service area information of the NSACF.

In some embodiments, the service area information may include any one or more of: a TAI list; and AMF service area information.

For the specific details of S701, reference may be made to the related description of steps S101 in FIG. 1, steps S201 and S2011-S2013 in FIG. 2, steps S301 and S3011 in FIG. 3, steps S401 and S4011-S4012 in FIG. 4, steps S501 and S5011 in FIG. 5, and step S601 in FIG. 6, which is not described herein.

S702, a deregistration request from a UE is received, the deregistration request carries S-NSSAIs and a UE identifier.

When the UE deregistration is performed, the UE may send the deregistration request to the AMF, and the deregistration request may carry the UE identifier and the S-NSSAIs.

S703, after completing a UE deregistration procedure according to the deregistration request, an availability check and update request is sent to the NSACF selected for the network slice which is identified by the S-NSSAIs, the availability check and update request includes the S-NSSAIs, the UE identifier, and an update flag, the update flag instructs to reduce the number of registered UEs.

After receiving the deregistration request from the UE, the AMF may execute the UE deregistration procedure, and after the UE deregistration procedure is completed, search for the NSACF selected for the network slice identified by the S-NSSAI included in the deregistration request, and send the availability check and update request message to a found NSACF, so that the NSACF can perform a check on the number of registered UEs according to the availability check and update request message.

S704, an availability check and update response message is received from the selected NSACF.

After receiving the availability check and update request message, the NSACF performs the check on the number of registered UEs in response to the availability check and update request message, and performs an update of the number of registered UEs and/or feeds back the session number availability check and update response message according to a check result. In the embodiment, since the update flag in the availability check and update request instructs to reduce the number of registered UEs, the NSACF reduces the number of registered UEs according to the update flag, and feeds back the availability check and update response message to the AMF after completing reduction of the number of registered UEs. After receiving the availability check and update response message, the AMF may confirm according to the availability check and update response message that the NSACF has performed the update of the number of registered UEs of the corresponding network slice.

According to the method for selecting an NSACF in the embodiment, the AMF may monitor the number of registered UEs of the corresponding network slice through the NSACF after the NSACF is selected.

Figure 8:
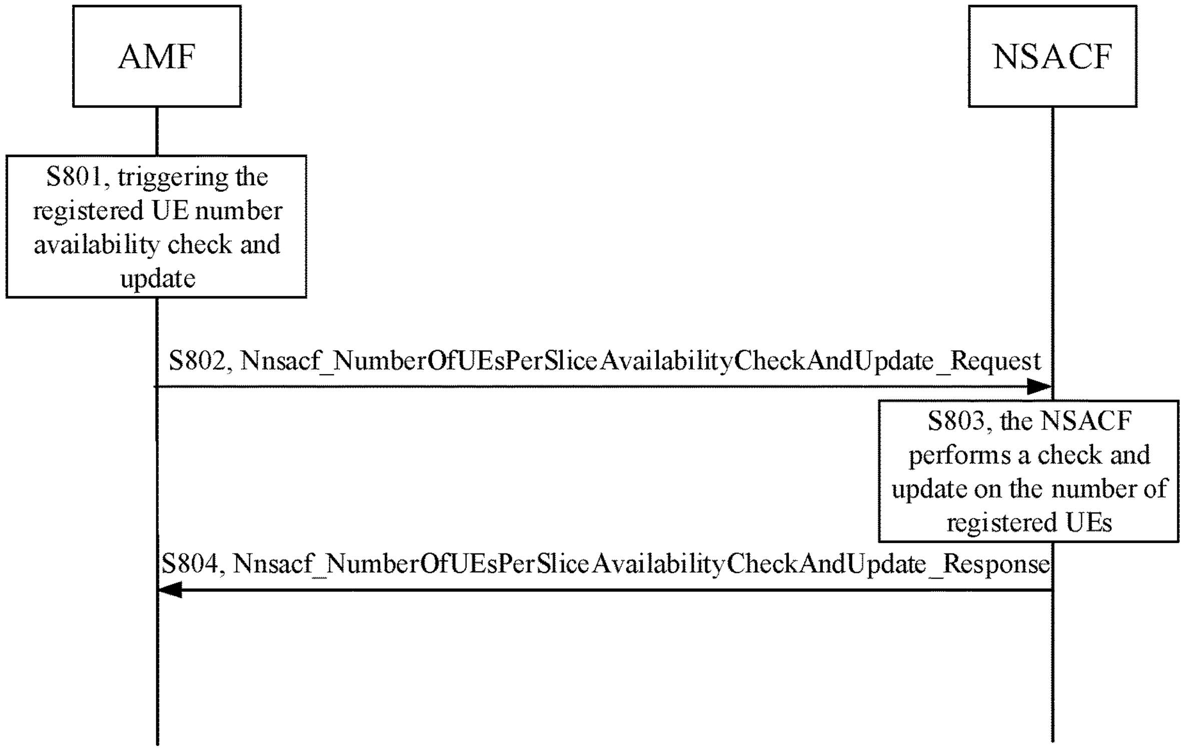
FIG. 8 illustrates an interaction process of selecting an NSACF and performing a registered UE number availability check and update according to an embodiment of the present disclosure.

FIG. 8 illustrates an interaction process of selecting an NSACF and performing a registered UE number availability check and update according to an embodiment of the disclosure. As shown in FIG. 8, the AMF selects the NSACF and interacts with the NSACF to implement the registered UE number availability check and update. Specifically, the following processes are included.

S801, the registered UE number availability check and update is triggered.

The registered UE number availability check and update may be triggered in response to a message received by the AMF from other devices, may also be triggered by the AMF based on a certain preset trigger mechanism.

For example, the registered UE number availability check and update may be triggered in response to a registration request message from the UE. In the case of the UE registration, the AMF may consider S-NSSAIs carried in a PDU session establishment request to select the NSACF based on service area information of the NSACF. The service area information of the NSACF may include one or more of a TAI list or AMF service area information. When selecting the NSACF, if one NSACF has been selected for the network slice and the service area information of the NSACF indicates that the selected NSACF can be used for the network slice, the AMF still selects the selected NSACF for the network slice to monitor the number of registered UEs of the network slice. If more than one NSACF has been selected for the network slice and the service area information of the more than one NSACF indicates that the more than one selected NSACF can be used for the network slice, the AMF selects the NSACF from the more than one selected NSACF for the network slice to monitor the number of registered UEs of the network slice. For example, the AMF selects the NSACF for the network slice from the more than one selected NSACF based on a service capability of the NSACF, to monitor the number of registered UEs of the network slice. In addition, if there is an operator service area policy, the AMF selects the NSACF for the network slice according to the service area information of the NSACF and the operator service area policy. The selected NSACF is used to monitor the number of registered UEs of the network slice. Selection of the NSACF may be performed when a UE registration or an AMF relocation is performed. In addition, the method for selecting an NSACF described herein is also applicable to selecting an NSACF instance.

The NSACF may be registered in an NRF, the NSACF provides its configuration information to the NRF, and the NRF marks that the NSACF is available. For a PDU session establishment procedure, the NSACF may provide the S-NSSAIs and the service area information of the NSACF as input information. If the NSACF is registered in the NRF, the AMF may use the NRF to select the NSACF.

The NSACF may be configured in the AMF, and the configuration information of the NSACF may indicate the service area information of the NSACF and the S-NSSAIs. If the NSACF is configured in the AMF, the AMF may select the NSACF using the configuration information of the NSACF in the AMF.

The operator service capability policy may be pre-configured in the AMF and/or the NRF.

In another example, the registered UE number availability check and update may be triggered in response to the AMF completing a UE deregistration procedure.

In another example, in the case of the AMF relocation (i.e., a handover from an old AMF to a new AMF), the new AMF may receive Allowed NSSAI of the old AMF from the old AMF. If one or more S-NSSAI in the Allowed NSSAI of the old AMF is not supported by the new AMF, that is, not included in the Allowed NSSAI of the new AMF, the new AMF will send a status update request message to the old AMF so that the old AMF performs status update. The status update request message includes the S-NSSAI that is not supported by the new AMF. After receiving the status update request message, for the S-NSSAI included in the status update request message, the old AMF sends the availability check and update request message carrying an update flag instructing to reduce the number of registered UEs to the NSACF which has been selected for the corresponding network slice, so that the NSACF reduces the number of registered UEs of the network slice.

S802, if the S-NSSAI is confirmed to be included in the Allowed NSSAI of the AMF, the AMF sends an availability check and update request message to the selected NSACF.

The availability check and update request (Nnsacf_NumberOfUEsPerSliceAvailabilityCheckAndUpdate_Request) message includes a UE identifier, S-NSSAIs, and the update flag. The update flag may instruct to increase the number of registered UEs when the UE registers to the corresponding network slice, or instruct to reduce the number of registered UEs when the UE deregisters from the corresponding network slice or the UE restarts to register to another network slice.

S803, the NSACF performs a check and update on the number of registered UEs based on the availability check and update request message provided by the AMF.

If the update flag in the availability check and update request message instructs to increase the number of registered UEs and the NSACF finds that the UE identifier in the availability check and update request message already exists in the registered UE list of the corresponding network slice, the NSACF will not increase the number of registered UEs because the UE has been considered as having been registered to the corresponding network slice.

If the update flag in the availability check and update request message instructs to increase the number of registered UEs, the NSACF finds that the UE identifier in the availability check and update request message does not exist in the registered UE list of the corresponding network slice and the number of registered UEs of the corresponding network slice does not reach a maximum number, the NSACF will add the UE identifier to the registered UE list and increase the number of registered UEs.

If the update flag in the availability check and update request message instructs to increase the number of registered UEs, the NSACF finds that the UE identifier in the availability check and update request message does not exist in the registered UE list of the corresponding network slice and the number of registered UEs of the corresponding network slice has reached the maximum number, the NSACF does not increase the number of registered UEs and return a result parameter indicating that the number of registered UEs of the corresponding network slice has reached the maximum number.

If the update flag in the availability check and update request message instructs to reduce the number of registered UEs, the NSACF removes the UE identifier in the availability check and update request message from the registered UE list of the corresponding network slice and reduce the number of registered UEs.

S804, the NSACF feeds back an availability check and update response message to the AMF.

When the NSACF finds that the number of registered UEs of the corresponding network slice has reached the maximum number, the NSACF feeds back the availability check and update response (Nnsacf_NumberOfUEsPerSliceAvailabilityCheckAndUpdate_Response) message to the AMF, which may include the result parameter as described above.

In the case of the UE registration, if the NSACF feeds back the result parameter indicating that the number of registered UEs of the network slice has reached the maximum number for all the S-NSSAIs in the registration request message, the AMF rejects the registration request message of the UE and returns the registration reject message to the UE. If, for a certain S-NSSAI in the registration request message, the NSACF does not feed back the result parameter indicating that the number of registered UEs of the network slice has reached the maximum number, the AMF performs the UE registration procedure and returns a registration accept message to the UE after completing the UE registration procedure. The registration reject message or the registration accept message includes, for example, rejected S-NSSAIs, a reject reason (such as "the number of registered UEs of the corresponding network slice has reached the maximum number") and an optional backoff time.

Figure 9:
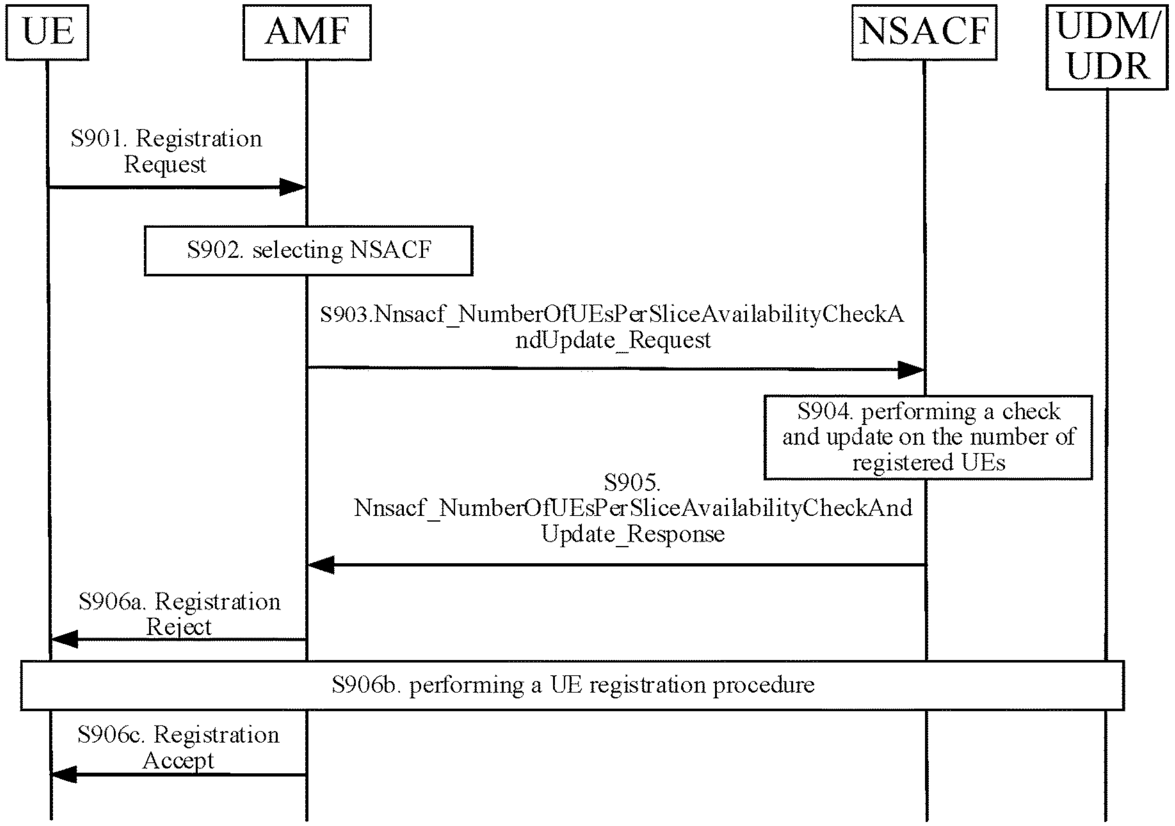
FIG. 9 illustrates an interaction process of selecting an NSACF and performing a registered UE number availability check and update in the case of performing a UE registration according to an embodiment of the present disclosure.

For example, FIG. 9 illustrates an interaction process of selecting an NSACF and performing a registered UE number availability check and update in the case of the UE registration according to an embodiment of the disclosure. As shown in FIG. 9, the AMF selects the NSACF and interacts with the NSACF to implement the registered UE number availability check and update. Specifically, the following processes are included.

- S901, the UE sends a registration request to the AMF, the registration request includes S-NSSAIs and a UE identifier.
- S902, the AMF selects the NSACF based on service area information of the NSACF in consideration of an S-NSSAI carried in the registration request.

In the case of the UE registration, the AMF may consider the S-NSSAIs carried in a PDU session establishment request to select the NSACF based on the service area information of the NSACF. The service area information of the NSACF may include one or more of a TAI list, a subset of the TAI list or AMF service area information. When selecting the NSACF, if one NSACF has been selected for the network slice and the service area information of the NSACF indicates that the selected NSACF can be used for the network slice, the AMF still selects the selected NSACF for the network slice to monitor the number of registered UEs of the network slice. If more than one NSACF has been selected for the network slice and the service area information of the more than one NSACF indicates that the more than one selected NSACF can be used for the network slice, the AMF selects the NSACF for the network slice from the more than one selected NSACF to monitor the number of registered UEs of the network slice. For example, the AMF selects the NSACF for the network slice from the more than one selected NSACF based on a service capability of the NSACF to monitor the number of registered UEs of the network slice. In addition, if there is an operator service area policy, the AMF selects the NSACF for the network slice according to the service area information of the NSACF and the operator service area policy, and the selected NSACF is used to monitor the number of registered UEs of the network slice. Selection of the NSACF may be performed when a UE registration or an AMF relocation is performed. In addition, the method for selecting the NSACF described herein is also applicable to selecting an NSACF instance.

The NSACF may be registered in an NRF, the NSACF provides its configuration information to the NRF, and the NRF marks that the NSACF is available. For a PDU session establishment procedure, the NSACF may provide the S-NSSAIs and the service area information of the NSACF as input information. If the NSACF is registered in the NRF, the AMF may use the NRF to select the NSACF.

The NSACF may be configured in the AMF, and the configuration information of the NSACF may indicate the service area information of the NSACF and the S-NSSAIs. If the NSACF is configured in the AMF, the AMF may select the NSACF using the configuration information of the NSACF in the AMF.

The operator service capability policy may be pre-configured in the AMF and/or the NRF.

- S903, if the S-NSSAI is confirmed to be included in an Allowed NSSAI of the AMF, the AMF sends an availability check and update request (Nnsacf_NumberOfUEsPerSliceAvailabilityCheckAndUpdate_Request) message to the selected NSACF.
- S904, the NSACF performs a check and update on the number of registered UEs based on the availability check and update request message provided by the AMF.
- S905, the NSACF feeds back an availability check and update response (Nnsacf_NumberOfUEsPerSliceAvailabilityCheckAndUpdate_Response) message to the AMF.
- S906, the AMF performs a UE registration according to the availability check and update response message, and specifically, S906 may include step **S906*a* or include steps S906*b*-S906*c***.
- **S906*a***, the AMF rejects a registration request of the UE and returns a registration reject message to the UE.
- **S906*b***, the AMF performs a UE registration procedure.
- **S906*c***: the AMF returns a registration accept message to the UE after completing the UE registration procedure.

Figure 10:
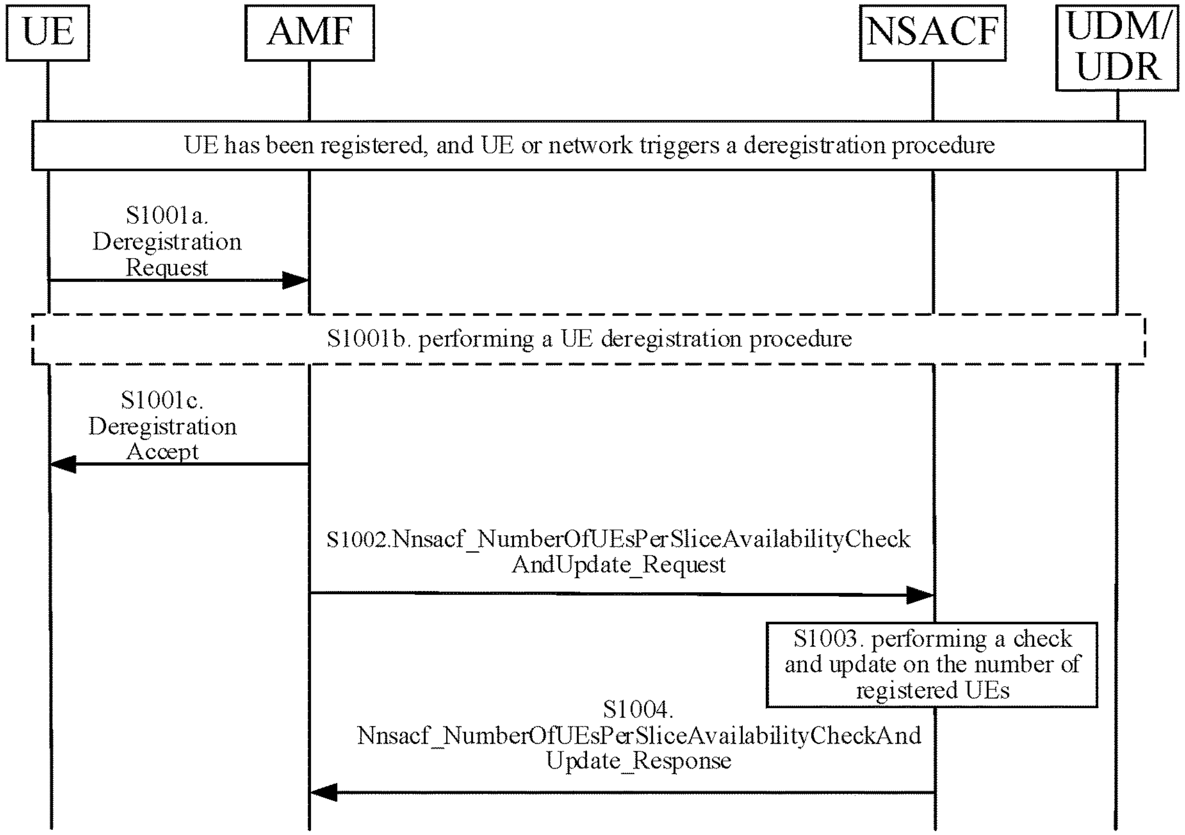
FIG. 10 illustrates an interaction process of performing a registered UE number availability check and update in the case of performing a UE deregistration according to an embodiment of the present disclosure.

As another example, FIG. 10 illustrates an interaction process of performing a registered UE number availability check and update in the case of the UE deregistration according to an embodiment of the present disclosure. The interaction process is based on the fact that the UE has been registered to the network slice, and the UE or the network triggers the deregistration procedure. As shown in FIG. 10, the AMF and the NSACF implement the registered UE number availability check and update through interactions. Specifically, the following processes are included.

S1001*a*, the UE sends a deregistration request to the AMF, the deregistration request includes S-NSSAIs and a UE identifier.

S1001*b*, the AMF performs a UE deregistration procedure.

S1001*c*, the AMF returns a deregistration accept message to the UE after completing the UE deregistration procedure.

S1002, if the S-NSSAI carried in the deregistration request is confirmed to be included in Allowed NSSAI of the AMF, the AMF sends an availability check and update request (Nnsacf_NumberOfUEsPerSliceAvailabilityCheckAndUpdate_Request) message to the selected NSACF.

S1003, the NSACF performs a check and update on the number of registered UEs based on the availability check and update request message provided by the AMF.

S1004, the NSACF feeds back an availability check and update response (Nnsacf_NumberOfUEsPerSliceAvailabilityCheckAndUpdate_Response) message to the AMF.

In the above embodiments of the disclosure, the methods according to the embodiments of the disclosure are described from the perspectives of the network device. In order to realize each of the functions in the methods according to the above embodiments of the disclosure, the network device may include a hardware structure, a software module, and realize each of the above functions in the form of hardware structure, software module, or a combination of hardware structure and software module. A certain function of the above functions may be performed in the form of hardware structure, software module, or a combination of hardware structure and software module.

Corresponding to the method for selecting an NSACF provided in the embodiments, an apparatus for selecting an NSACF is further provided in the disclosure. Since the apparatus for selecting an NSACF provided in the embodiments of the disclosure corresponds to the method for selecting an NSACF provided in the embodiments, the implementation of the method for selecting an NSACF is also applicable to the apparatus for selecting an NSACF provided in the embodiments, which is not described in detail in the embodiment.

Figure 11:
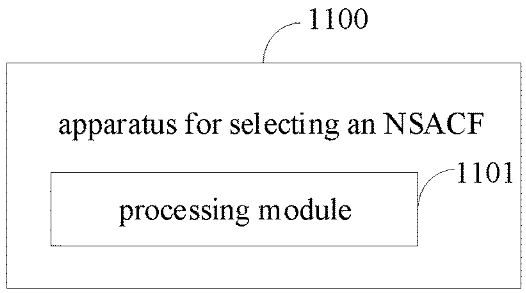
FIG. 11 is a block diagram of an apparatus for selecting an NSACF according to an embodiment of the present disclosure.

FIG. 11 is a block diagram of an apparatus 1100 for selecting an NSACF according to an embodiment of the disclosure.

As shown in FIG. 11, the apparatus 1100 may be applied to a network device, and the apparatus 1100 may include a processing module 1601. The processing module 1601 may be configured to select the NSACF for a network slice based on service area information of the NSACF.

According to the apparatus for selecting an NSACF in the embodiments of the disclosure, the network device selects the NSACF for the network slice based on the service area information of the NSACF. The NSACF is selected by considering the service area information of the NSACF, so that the NSACF can be selected more accurately and with less signaling and function interactions.

In an embodiment, the network device may be an AMF.

In some embodiments, when the network device is the AMF, the service area information includes any one or more of: a TAI list; or AMF service area information.

In some embodiments, the processing module 1101 is configured to: while one NSACF is selected for the network slice and the service area information of the NSACF indicates that the selected NSACF can be used for the network slice, maintain the selected NSACF being selected for the network slice.

In some embodiments, the processing module 1101 is configured to: while more than one NSACF is selected for the network slice and the service area information of the more than one NSACF indicates that the more than one selected NSACF can be used for the network slice, select the NSACF for the network slice from the more than one selected NSACF.

In some embodiments, the processing module 1101 is configured to: select the NSACF for the network slice from the more than one selected NSACF based on a service capability of the NSACF. The service capability includes at least one of: a first service capability of supporting monitoring a number of registered UEs of the network slice, or a second service capability of supporting monitoring a number of PDU sessions created by the network slice.

In some embodiments, the processing module 1101 is configured to: while one or more NSACFs are selected for the network slice and the service area information of the one or more NSACFs indicates that none of the one or more selected NSACFs can be used for the network slice, select, for the network slice, the NSACF not belonging to the one or more selected NSACFs.

In some embodiments, if there is an operator service area policy, the processing module 1101 is configured to select the NSACF for the network slice based on the service area information of the NSACF and the operator service area policy. The operator service area policy includes a specific rule of selecting the NSACF based on the service area information made by an operator.

Alternatively, the operator service area policy is pre-configured in at least one of the network device and an NRF.

In some embodiments, the processing module 1101 is configured to: select the NSACF for the network slice from registered NSACFs of the NRF, in which the NRF stores configuration information of the registered NSACFs, and the configuration information includes S-NSSAIs and the service area information of the registered NSACFs.

In some embodiments, the processing module 1101 is configured to: select the NSACF for the network slice from the pre-configured NSACFs of the network device, in which, the network device stores configuration information of the pre-configured NSACFs, and the configuration information includes S-NSSAIs and the service area information of the pre-configured NSACFs.

Figure 12:
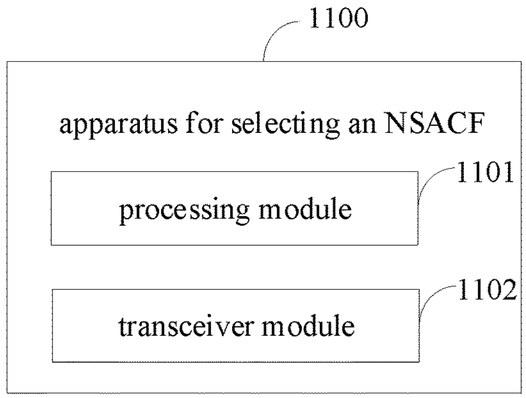
FIG. 12 is a block diagram of an apparatus for selecting an NSACF according to an embodiment of the present disclosure.

In some embodiments, as shown in FIG. 12, the apparatus 1100 further includes: a transceiver module 1102. The transceiver module 1102 may be configured to receive a registration request message from a UE, in which the registration request message is triggered in a UE registration procedure or an AMF relocation procedure, and the registration request message carries S-NSSAIs and a UE identifier. The processing module 1101 is configured to select NSACF for the network slice after the transceiver module 1102 receives the registration request message.

In some embodiments, the transceiver module 1102 is configured to: send a UE number availability check and update request message to a selected NSACF, in which the UE number availability check and update request message includes the S-NSSAIs, the UE identifier, and an update flag, and the update flag instructs to increase a number of registered UEs; and receive a UE number availability check and update response message from the selected NSACF. The processing module 1101 is further configured to perform a UE registration based on the UE number availability check and update response message.

In some embodiment, the processing module 1101 is further configured to: while the UE number availability check and update response message indicates that an availability check succeeds, perform the UE registration procedure or the AMF relocation procedure, and instruct the transceiver module 1102 to return a registration accept message to the UE after the UE registration procedure or the AMF relocation procedure is completed; and while the UE number availability check and update response message indicates that the availability check fails, instruct the transceiver module 1102 to return a registration reject message to the UE.

In some embodiments, the transceiver module 1102 is configured to: receive a deregistration request from the UE, in which the deregistration request carries the S-NSSAIs and the UE identifier; after completing a UE deregistration procedure based on the deregistration request, send a UE number availability check and update request to the NSACF selected for the network slice identified by the S-NSSAIs, in which the UE number availability check and update request comprises the S-NSSAIs, the UE identifier, and an update flag, and the update flag instructs to reduce a number of registered UEs; and receive a UE number availability check and update response message from the selected NSACF.

Figure 13:
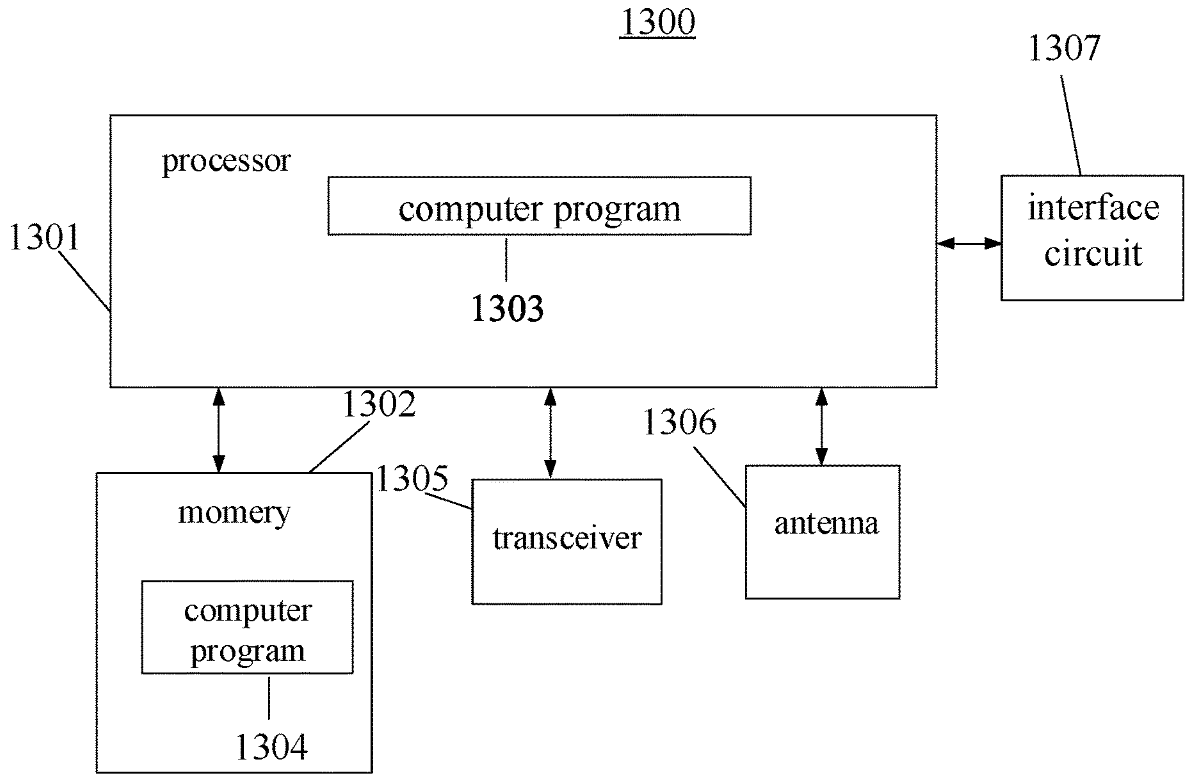
FIG. 13 is a block diagram of a communication apparatus according to an embodiment of the present disclosure.

Referring to FIG. 13, FIG. 13 is a block diagram of a communication apparatus according to an embodiment of the disclosure. The communication apparatus 1300 may be a network device, or may be a user equipment, or may be a chip, a chip system, or a processor that supports the network device to implement the above methods, or may be a chip, a chip system, or a processor that supports a terminal device to implement the above methods. The apparatus may be used to implement the method described in the foregoing method embodiments with reference to the description of the above-described method embodiments.

The communication apparatus 1300 may include one or more processors 1301. The processor 1301 may be a general-purpose processor or a dedicated processor, such as, a baseband processor and a central processor. The baseband processor may be configured to process a communication protocol and communication data, and the central processor may be configured to control a communication apparatus (for example, a base station, a baseband chip, a terminal device, a terminal device chip, a distributed unit (DU), or a centralized unit (CU)), executing computer programs, and processing data of the computer programs.

Alternatively, the communication apparatus 1300 may further include one or more memories 1302 on which a computer program 1304 may be stored, and the processor 1301 executes the computer program 1304, so that the communication apparatus 1300 executes the methods described in the foregoing method embodiments. Alternatively, the memory 1302 may further store data. The communication apparatus 1300 and the memory 1302 may be separately disposed, or may be integrated together.

Alternatively, the communication apparatus 1300 may further include a transceiver 1305 and an antenna 1306. The transceiver 1305 may be referred to as a transceiver unit, a transceiver, or a transceiver circuit, and is configured to implement a transceiver function. The transceiver 1305 may include a receiver and a transmitter, and the receiver may be referred to as a receiving machine or a receiving circuit, for realizing the receiving function. The transmitter may be referred to as a transmitter machine or a transmitting circuit, for realizing the transmitting function.

Alternatively, the communication apparatus 1300 may further include one or more interface circuits 1307. The interface circuit 1307 is configured to receive code instructions and transmit the code instructions to the processor 1301. The processor 1301 runs the code instructions to cause the communication apparatus 1300 to perform the methods described in the foregoing method embodiments.

The communication apparatus 1300 is a network device: the processor 1301 is configured to execute steps S101 in FIG. 1, steps S201 and S2011-S2013 in FIG. 2, steps S301 and S3011 in FIG. 3, steps S401 and S4011-S4012 in FIG. 4, steps S501 and S5011 in FIG. 5, steps S601, S603 and S6031 in FIG. 6, and step S701 in FIG. 7; the transceiver 1305 is configured to perform steps S602-S603 and S6031-S6032 in FIG. 6, and steps S702-S704 in FIG. 7.

In an implementation, the processor 1301 may include a transceiver for implementing the receiving and sending functions. The transceiver may be, for example, a transceiver circuit, an interface, or an interface circuit. The transceiver circuit, the interface, or the interface circuit for implementing the receiving and sending functions may be separated or may be integrated together. The transceiver circuit, the interface, or the interface circuit described above may be used for reading and writing code/data, or may be used for signal transmission or delivery.

In an implementation, the processor 1301 may store a computer program 1303. When the computer program 1303 runs on the processor 1301, the communication apparatus 1330 is caused to perform the methods described in the method embodiments above. The computer program 1303 may be solidified in the processor 1301, and in such case the processor 1301 may be implemented by hardware.

In an implementation, the communication apparatus 1300 may include circuits. The circuits may implement the sending, receiving or communicating function in the preceding method embodiments. The processor and the transceiver described in this disclosure may be implemented on integrated circuits (ICs), analog ICs, radio frequency integrated circuits (RFICs), mixed signal ICs, application specific integrated circuits (ASICs), printed circuit boards (PCBs), and electronic devices. The processor and the transceiver can also be produced using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs) and so on.

The communication apparatus described in the above embodiments may be a network device or a terminal device (for example, the first terminal device in the foregoing method embodiments), but the scope of the communication apparatus described in the disclosure is not limited thereto, and the structure of the communication apparatus may not be limited by FIG. 13. The communication apparatus may be a stand-alone device or may be part of a larger device. For example, the described communication apparatus may be:

(1) a stand-alone IC, a chip, a chip system or a subsystem;

(2) a collection of ICs including one or more ICs, optionally, the collection of ICs may also include storage components for storing data and computer programs;

(3) an ASIC, such as a modem;

(4) modules that may be embedded in other devices;

(5) a receiver, a terminal device, a smart terminal device, a cellular phone, a wireless device, a handheld machine, a mobile unit, an in-vehicle device, a network device, a cloud device, an artificial intelligence device, and the like; and (6) Others.

Figure 14:
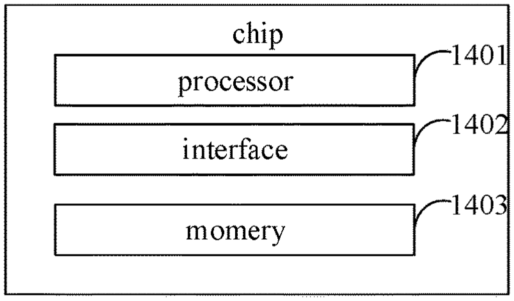
FIG. 14 is a block diagram of a chip according to an embodiment of the present disclosure.

The case where the communication apparatus may be a chip or a chip system is described with reference to the schematic structure of the chip shown in FIG. 14. The chip shown in FIG. 8 includes a processor 1401 and an interface 1402. There may be one or more processors 1401, and there may be multiple interfaces 1402.

In cases where the chip is used to implement the function of the network device in the embodiments of the disclosure: the processor 1401 is configured to perform steps S101 in FIG. 1, steps S201 and S2011-S2013 in FIG. 2, steps S301 and S3011 in FIG. 3, steps S401 and S4011-S4012 in FIG. 4, steps S501 and S5011 in FIG. 5, steps S601, S603 and S6031 in FIG. 6, and step S701 in FIG. 7; the interface 1402 is configured to perform steps S602-S603 and S6031-S6032 in FIG. 6, and steps S702-S704 in FIG. 7.

Alternatively, the chip further includes a memory 1403, and the memory 1403 is configured to store necessary computer programs and data.

It is understood by those skilled in the art that various illustrative logical blocks and steps listed in the embodiments of the disclosure may be implemented by electronic hardware, computer software, or a combination of both. Whether such function is implemented by hardware or software depends on the particular application and the design requirements of the entire system. Those skilled in the art may, for each particular application, use various methods to implement the described function, but such implementation should not be understood as beyond the scope of protection of the embodiments of the disclosure.

The disclosure further provides a readable storage medium having stored thereon instructions that, when executed by a computer, implement the functions of any of the foregoing method embodiments.

The disclosure further provides a computer program product that, when executed by a computer, implements the functions of any of the foregoing method embodiments.

The above embodiments may be implemented in whole or in part by software, hardware, firmware, or any combination thereof. When implemented using software, the above embodiments may be implemented, in whole or in part, in the form of a computer program product. The computer program product includes one or more computer programs. When loading and executing the computer program on the computer, all or part of processes or functions described in the embodiments of the disclosure is implemented. The computer may be a general-purpose computer, a dedicated computer, a computer network, or other programmable devices. The computer program may be stored in a computer-readable storage medium or transmitted from one computer-readable storage medium to another computer-readable storage medium. For example, the computer program may be transmitted from one web site, computer, server, or data center to another web site, computer, server, or data center, in a wired manner (e.g., using coaxial cables, fiber optics, or digital subscriber lines (DSLs) or wireless manner (e.g., using infrared wave, wireless wave, or microwave). The computer-readable storage medium may be any usable medium to which the computer is capable to access or a data storage device such as a server integrated by one or more usable mediums and a data center. The usable medium may be a magnetic medium (e.g., a floppy disk, a hard disk, and a tape), an optical medium (e.g., a high-density digital video disc (DVD)), or a semiconductor medium (e.g., a solid state disk (SSD)).

Those skilled in the art can understand that the first, second, and other various numerical numbers involved in the disclosure are only described for the convenience of differentiation, and are not used to limit the scope of the embodiments of the disclosure, or used to indicate the order of precedence.

The term "at least one" in the disclosure may also be described as one or more, and the term "multiple" may be two, three, four, or more, which is not limited in the disclosure. In the embodiments of the disclosure, for a type of technical features, "first", "second", and "third", and "A", "B", "C" and "D" are used to distinguish different technical features of the type, the technical features described using the "first", "second", and "third", and "A", "B", "C" and "D" do not indicate any order of precedence or magnitude.

As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relation between the client and the server is generated by computer programs that run on the corresponding computer and have a client-server relationship with each other.

It should be understood that various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

In addition, it should be understood that the various embodiments described in the present disclosure may be implemented separately, or may be implemented in combination with other embodiments in the case that the solution is allowed.

A person of ordinary skill in the art may be aware that units and algorithm steps of the examples described in connection with the embodiments disclosed herein can be implemented by an electronic hardware, or a combination of computer software and an electronic hardware. Whether the functions are performed by hardware or software depends on specific applications and design constraint conditions of the technical solutions. Those skilled in the art may use different methods to implement the described functions for each specific application, but it should not be considered that the implementation goes beyond the scope of the present disclosure.

Those skilled in the art may clearly understand that, for the convenience and brevity of description, the described system, apparatus, and specific working process of the unit may refer to a corresponding process in the above method embodiments, and details are not described herein again.

The above is merely a specific embodiment of the present disclosure, but the scope of protection of the present disclosure is not limited thereto, and any person skilled in the art may easily conceive of changing or replacing within the technical scope disclosed in the present disclosure, and should be covered within the scope of protection of the present disclosure. Therefore, the protection scope of the present disclosure shall be subject to the protection scope of the claims.

What is claimed is:

1. A method for selecting a network slice admission control function (NSACF), performed by a network device, comprising:

during a user equipment (UE) registration procedure, selecting the NSACF for a network slice based on service area information of the NSACF, wherein a registration request message from a UE carries single network slice selection assistance information (S-NSSAI) and a UE identifier;

sending a first request message to a selected NSACF, wherein the first request message comprises the S-NSSAI, the UE identifier, and an update flag, and the update flag instructs to increase a number of registered UEs;

receiving a first response message from the selected NSACF;

returning a registration accept message to the UE in a case where the first response message indicates that the number of registered UEs does not reach a maximum number; and returning a registration reject message to the UE in a case where the first response message indicates that the number of registered UEs reaches the maximum number.

2. The method of claim 1, wherein the network device is an access and mobility management function (AMF).

3. The method of claim 2, wherein the service area information comprises any one or more of:

a tracking area identity list; or

AMF service area information.

4. The method of claim 1, wherein selecting the NSACF for the network slice comprises:

determining that one NSACF is selected for the network slice and the service area information of the NSACF indicates that the network slice has a capability of using the selected NSACF; and maintaining the selected NSACF being selected for the network slice.

5. The method of claim 1, wherein selecting the NSACF for the network slice comprises:

determining that more than one NSACF is selected for the network slice;

selecting the NSACF for the network slice from the more than one NSACF based on a service capability of the NSACF;

wherein the service capability comprises at least one of:

a first service capability of supporting monitoring a number of registered user equipments (UEs) of the network slice, or a second service capability of supporting monitoring a number of protocol data unit (PDU) sessions created by the network slice.

6. The method of claim 1, wherein selecting the NSACF for the network slice comprises:

determining that one or more NSACFs are selected for the network slice and the service area information of the one or more NSACFs indicates that the network slice has no capability of using the one or more NSACFs; and selecting, for the network slice, the NSACF not belonging to the one or more selected NSACFs.

7. The method of claim 1, wherein there is an operator service area policy, selecting the NSACF for the network slice comprises:

selecting the NSACF for the network slice based on the service area information of the NSACF and the operator service area policy;

wherein the operator service area policy comprises a specific rule of selecting the NSACF based on the service area information made by an operator.

8. The method of claim 7, wherein the operator service area policy is pre-configured in at least one of the network device or a network repository function (NRF).

9. The method of claim 1, wherein selecting the NSACF for the network slice comprises:

selecting the NSACF for the network slice from registered NSACFs of an NRF, based on configuration information of the registered NSACFs, wherein the configuration information comprises S-NSSAI and the service area information of the registered NSACFs.

10. The method of claim 1, wherein selecting the NSACF for the network slice comprises:

selecting the NSACF from NSACFs locally configured by the network device, based on configuration information of the NSACFs locally configured, wherein the configuration information comprises S-NSSAI and the service area information of the NSACFs locally configured.

11. The method of claim 1, wherein the registration request message is triggered in the UE registration procedure or an AMF relocation procedure.

12. The method of claim 1, further comprising:

receiving a deregistration request message from a UE, wherein the deregistration request message carries S-NSSAI and a UE identifier;

after completing a UE deregistration procedure based on the deregistration request message, sending a second request message to the NSACF selected for the network slice identified by the S-NSSAI, wherein the second request message comprises the S-NSSAI, the UE identifier, and an update flag, and the update flag instructs to reduce a number of registered UEs; and receiving a second response message from the selected NSACF.

13. A communication apparatus, comprising: a transceiver; a memory; and a processor, wherein the processor respectively connects to the transceiver and the memory, and is configured to execute computer-executable instructions stored on the memory to control reception and transmission of a wireless signal by the transceiver and implement the following operation:

during a user equipment (UE) registration procedure, selecting a network slice admission control function (NSACF) for a network slice based on service area information of the NSACF, wherein a registration request message from a UE carries single network slice selection assistance information (S-NSSAI) and a UE identifier;

sending a first request message to a selected NSACF, wherein the first request message comprises the S-NSSAI, the UE identifier, and an update flag, and the update flag instructs to increase a number of registered UEs;

receiving a first response message from the selected NSACE;

returning a registration accept message to the UE in a case where the first response message indicates that the number of registered UEs does not reach a maximum number; and returning a registration reject message to the UE in a case where the first response message indicates that the number of registered UEs reaches the maximum number.

14. A non-transitory computer-readable storage medium storing computer-executable instructions thereon, wherein when the computer-executable instructions are executed by a processor, the processor is configured to:

during a user equipment (UE) registration procedure, select a network slice admission control function (NSACF) for a network slice based on service area information of the NSACF, wherein a registration request message from a UE carries single network slice selection assistance information (S-NSSAI) and a UE identifier;

sending a first request message to a selected NSACF, wherein the first request message comprises the S-NSSAI, the UE identifier, and an update flag, and the update flag instructs to increase a number of registered UEs;

receiving a first response message from the selected NSACF;

returning a registration accept message to the UE in a case where the first response message indicates that the number of registered UEs does not reach a maximum number; and returning a registration reject message to the UE in a case where the first response message indicates that the number of registered UEs reaches the maximum number.

* * * * *